(12) United States Patent
Surendranath

(10) Patent No.: US 9,306,892 B2
(45) Date of Patent: *Apr. 5, 2016

(54) TRANSACTION MESSAGE COLLECTOR

(71) Applicant: SAP SE, Walldorf (DE)

(72) Inventor: Shibin Surendranath, Bangalore (IN)

(73) Assignee: SAP SE, Walldorf (DE)

( * ) Notice: Subject to any disclaimer, the term of this patent is extended or adjusted under 35 U.S.C. 154(b) by 38 days.

This patent is subject to a terminal disclaimer.

(21) Appl. No.: 14/104,128

(22) Filed: Dec. 12, 2013

(65) Prior Publication Data

US 2014/0101274 A1   Apr. 10, 2014

Related U.S. Application Data

(63) Continuation of application No. 13/047,824, filed on Mar. 15, 2011, now Pat. No. 8,635,342.

(51) Int. Cl.
*G06F 15/16* (2006.01)
*H04L 12/58* (2006.01)
*G06F 9/54* (2006.01)

(52) U.S. Cl.
CPC ............... *H04L 51/22* (2013.01); *G06F 9/542* (2013.01); *G06F 9/546* (2013.01); *G06F 2209/547* (2013.01)

(58) Field of Classification Search
None
See application file for complete search history.

(56) References Cited

U.S. PATENT DOCUMENTS

| 7,395,310 | B1 * | 7/2008 | Sikora et al. | 709/201 |
| 8,139,596 | B2 * | 3/2012 | Gale et al. | 370/416 |
| 8,301,687 | B2 * | 10/2012 | Rokicki et al. | 709/201 |
| 2004/0254993 | A1 * | 12/2004 | Mamas | 709/206 |
| 2005/0144218 | A1 * | 6/2005 | Heintz | 709/202 |
| 2008/0196039 | A1 * | 8/2008 | Garrard et al. | 719/314 |
| 2010/0095165 | A1 * | 4/2010 | Freund et al. | 714/48 |
| 2010/0241712 | A1 * | 9/2010 | Nitzsche et al. | 709/206 |
| 2010/0318673 | A1 * | 12/2010 | Kemp et al. | 709/232 |
| 2011/0276636 | A1 * | 11/2011 | Cheng et al. | 709/206 |

* cited by examiner

*Primary Examiner* — Shirley Zhang

(57) ABSTRACT

Various embodiments of systems and methods for a transaction message collector are described herein. The message collector receives the message from a message producer. In one aspect, the message is stored in an active message bulk storage or a new active message bulk storage. In another aspect, after the message is stored in the message collector, a confirmation is sent from the message collector to the message producer informing the message producer that the message is stored in the message collector. In yet another aspect, the active message bulk storage is forwarded to a message consumer for consumption based upon meeting at least one of plurality of time or memory based conditions. In a further aspect, after the active message bulk storage is consumed by the message consumer a result of consumption of the active message bulk storage is created and sent to the message producer.

30 Claims, 9 Drawing Sheets

| MESSAGE TYPE | RESULT HANDLER |
|---|---|
| A | RESULT HANDLER 'A' 502<br>INTERMEDIATE RESULT HANDLER 'A' 508 |
| B | RESULT HANDLER 'B' 504<br>INTERMEDIATE RESULT HANDLER 'B' 510 |
| C | RESULT HANDLER 'C' 506<br>INTERMEDIATE RESULT HANDLER 'C' 512 |

FIG. 6

| MESSAGE TYPE | EXECUTOR |
|---|---|
| A | EXECUTOR 'A' 514 |
| B | EXECUTOR 'B' 516 |
| C | EXECUTOR 'C' 518 |

| MESSAGE TYPE | ACTIVE MESSAGE BULK STORAGE |
|---|---|
| A | ACTIVE MESSAGE BULK 'A' STORAGE |
| B | ACTIVE MESSAGE BULK 'B' STORAGE |
| C | ACTIVE MESSAGE BULK 'C' STORAGE |

| MESSAGE ID LIST |
|---|
| 1 |
| 2 |
| 3 |
| 4 |

| MESSAGE | RESULT |
|---|---|
| 1 | SUCCESSFUL |
| 2 | EXCEPTION |

TRANSACTION MESSAGE COLLECTOR

CROSS-REFERENCES TO RELATED APPLICATIONS

This application is a continuation application of U.S. patent application Ser. No. 13/047,824, filed Mar. 15, 2011, which is incorporated herein by reference.

FIELD

Embodiments generally relate to computer systems, and more particularly to methods and systems for determining status of a message during a data communication.

BACKGROUND

Messaging systems such as Java Message Service (JMS) allow different applications to communicate with each other. Generally, the messaging systems facilitate data communication between a message producer and a message consumer. The message producer is used to send a message to the message consumer. The messaging system may also include one or more intermediate components that process the message before the message consumer receives the message for consumption. An example of the message could be a file or an E-Mail which is read from a database by the message producer. The intermediate components perform various processes on this file or E-Mail, and finally this processed file or E-Mail is received by the message consumer. An example of the message consumer may be a mail box of a user that receives the E-Mail retrieved by the message producer from an E-Mail server.

In certain cases, the messaging system includes a non-bulk producer of message and a bulk consumer of message. The present day messaging systems use a component such as a Message Aggregator, which receives the message from the non-bulk producer, aggregates the message to form a bulk, and forwards the bulk to the bulk message consumer for consumption. The messaging system using the Message Aggregator uses an input channel for transmitting the messages from the message producer to the Message Aggregator and an output channel for transmitting the bulk from the Message Aggregator to the message consumer.

The Message Aggregator allows data communication in messaging system. However, in case of issues with either the Message Aggregator or the bulk message consumer (e.g., the Message Aggregator or the bulk message consumer is shut down) there is no way for the non-bulk message producer to know the status of the message. This might lead to loss of message in the messaging system, which is undesirable.

Therefore, a method and system is required that provides the status of the message in the messaging system. Also, a method is required that uses a single channel for all communications in the messaging system.

SUMMARY

Various embodiments of systems and methods for a transaction message collector are described herein. A message collector receives a message from a message producer. The message is stored in an active message bulk storage stored in the message producer. The message is stored in the active message bulk storage corresponding to a message type of the message. A confirmation is sent from the message collector to the message producer, the confirmation informing the message producer that the message is stored in the active message bulk storage.

The active message bulk storage is forwarded from the message collector to a message consumer, for consumption, if at least one of a plurality of time or memory based conditions is satisfied. The message collector receives a result of consumption of the active message bulk storage from the executor corresponding to the message type of the active message bulk storage. The message collector forwards the result of consumption of the active message bulk storage from the message collector to the message producer via the result handler corresponding to the message type of the active message bulk storage.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 6 illustrates a result handler hash map stored in a message collector, according to an embodiment.

FIG. 7 illustrates an executor hash map stored in the message collector, according to an embodiment.

FIG. 8 illustrates an active message bulk storage hash map stored in the message collector, according to an embodiment.

FIG. 9 illustrates a message ID list storing the MsgIDs of each of the messages stored in the message collector, according to an embodiment.

FIG. 10 illustrates the result of consumption hash map stored in the message collector, according to an embodiment

DETAILED DESCRIPTION

Embodiments of techniques for transaction message collector are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
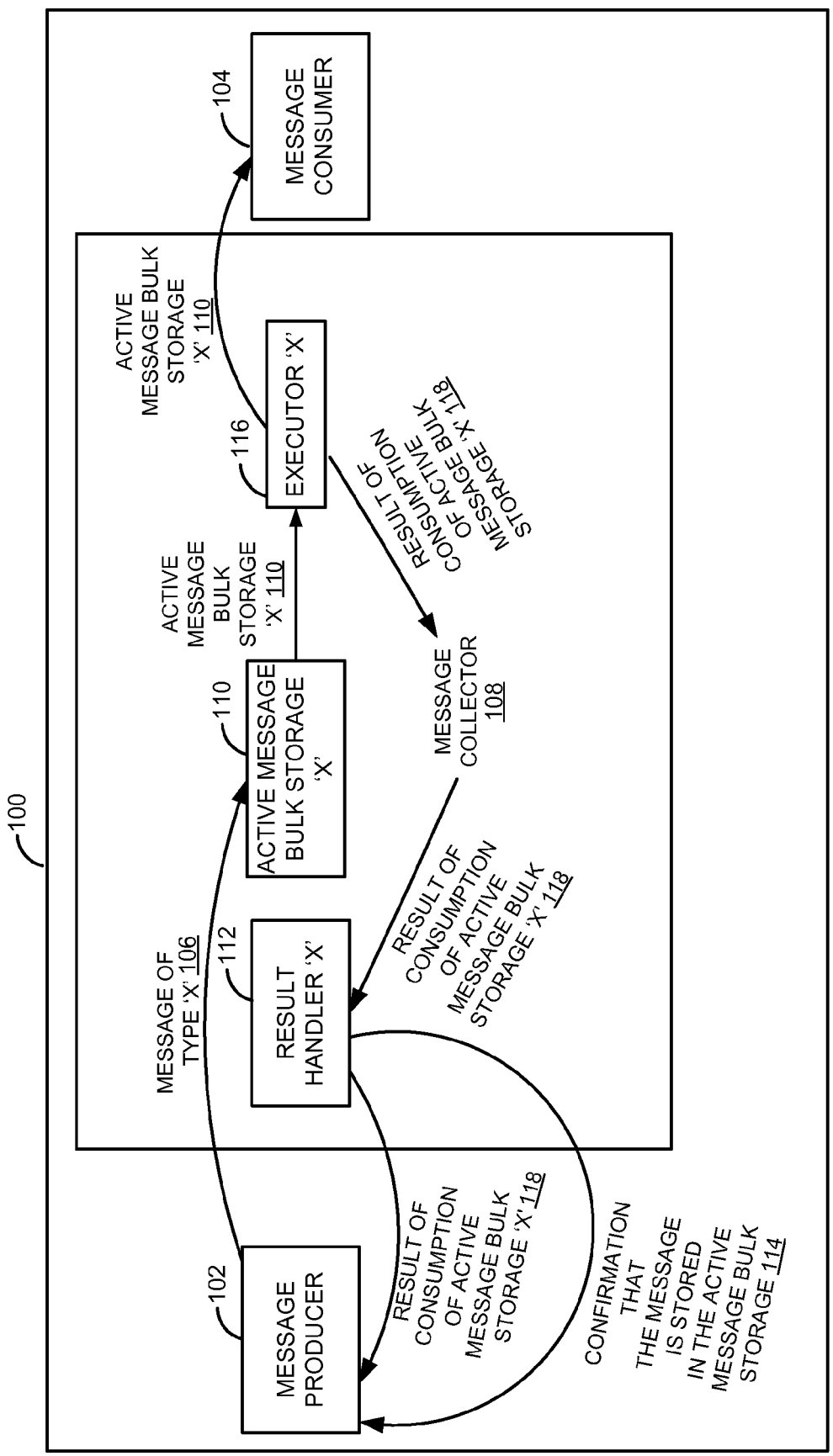
FIG. 1 is a block diagram illustrating data communication in a messaging system, according to an embodiment.

FIG. 1 is a block diagram illustrating data communication in a messaging system 100, according to an embodiment. In one embodiment, the messaging system 100 includes a message producer 102 that sends a message to a message consumer 104. The message producer 102 may be a non-bulk message producer, i.e., the message producer 102 sends one message at a time to the message consumer 104. Each message sent by the message producer 102 has a message identification (MsgID), which represents the message. In one embodiment, each message has a message type. As shown in FIG. 1, the message 106 being sent from message producer 102 is of type "X." Examples of the message type may include sales order, purchase order, or invoice.

In one embodiment, the messaging system 100 includes the message consumer 104. The message consumer 104 may be a bulk message consumer, i.e., the message consumer 104 can consume a plurality of messages stored in an active message bulk storage at same time.

In one embodiment, the messaging system 100 includes a message collector 108. The message collector 108 stores the message 106 sent from the message producer 102 in an active message bulk storage 110 in the message collector 108. Each active message bulk storage in the message collector 108 corresponds to a message type of the message. For example, the active message bulk storage 110 corresponds to message of type "X". The active message bulk storage 110, corresponding to message of type "X", stores the message 106 of type "X" received from the message producer 102.

In one embodiment, a result handler 112 is registered with the message collector 108. Each result handler is registered corresponding to a message type of the message. For example, the result handler 112 corresponds to the message 106 of type "X". After the message 106 of type "X" is stored in the active message bulk storage 110 the message collector 108 sends a confirmation 114 to the message producer 102 that the message is stored in the active message bulk storage 110. In one embodiment, the message collector 108 sends the confirmation via the result handler 112 corresponding to message 106 of type "X".

In one embodiment, an executor 116 is registered with the message collector 108. Each executor is registered corresponding to a message type of the active message bulk storage 110. The executor 116 corresponds to the active message bulk of type "X". As shown, the message collector 108 forwards the active message bulk storage 110 to the message consumer 104 via the executor 116. After the active message bulk storage 110 is consumed by the message consumer 104 the executor 116 prepares a result of consumption 118 of the active message bulk storage 108. The executor 116 then sends the result of consumption 118 to the message collector 108. Finally, the message collector 108 forwards the result of consumption 118 of the active message bulk storage 110 to the message producer 102 via the result handler 112 corresponding to the message type "X" of the active message bulk storage 110.

Figure 2:
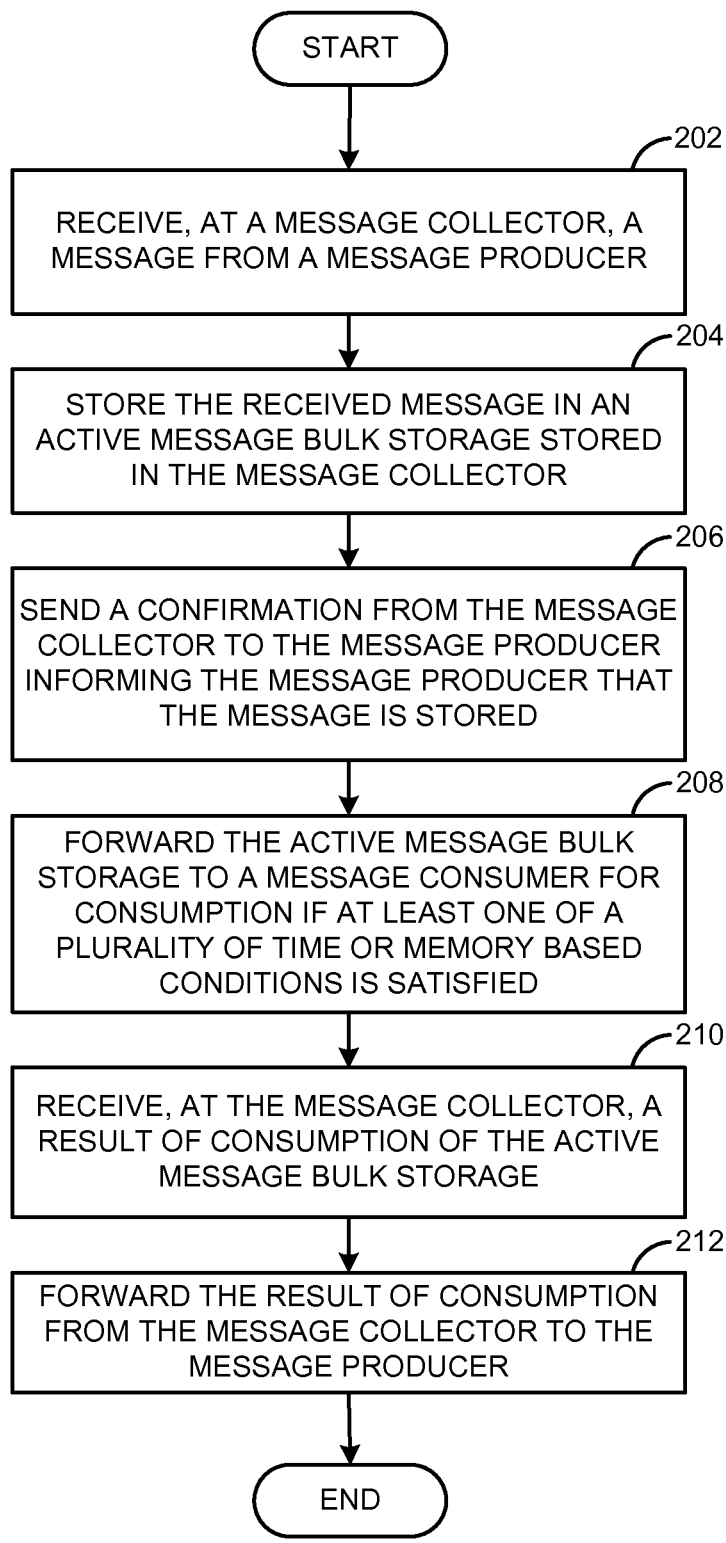
FIG. 2 is a flow diagram illustrating a method for data communication, according to an embodiment.

FIG. 2 is a flow diagram illustrating a method for data communication, according to an embodiment. Initially at block 202, the message collector receives a message from the message producer. The message collector may receive the message from the message producer in a non-bulk manner, i.e., one message at a time. In one embodiment, the message producer sends the message to the message collector using a thread. In one embodiment, each message is sent to the message collector using a separate thread.

Next at block 204, the message received from the message producer is stored in the message collector. The message received from the message producer is stored in the active message bulk storage in the message collector. In one embodiment, the message collector stores one or more active message bulk storage. Each of the one or more active message bulk storage corresponds to a different message type. For example, the message collector may store an active message bulk storage 1 for message type 1, an active bulk storage 2 for message type 2, and an active message bulk storage 3 for message type 3.

As discussed above, the received message is stored in the active message bulk storage corresponding to the message type of the message. For example, if the message type of the received message is 1, the message is stored in the active message bulk storage 1.

In one embodiment, the message collector stores a message ID list. The MsgID of each of the messages stored in the message collector is stored in the message ID list. The MsgID of the message that has been sent to the message consumer for consumption is removed from the message ID list.

Next at block 206, a confirmation is sent from the message collector to the message producer informing the message producer that the message is stored in the active message bulk storage stored in the message collector. The confirmation is sent to the message producer after the received message is stored in the active message bulk storage in the message collector. In one embodiment, the message collector sends the confirmation to the message producer via the result handler corresponding to the message type of the message.

In one embodiment, the message producer may also send a request to the message collector to determine whether the received message is stored in the message collector. The message producer sends the request by sending the message identification (MsgID) of the message. The confirmation is sent to the message producer when the received message is stored in the message collector. In one embodiment, a check is performed whether the MsgID received by the message producer is stored in the message ID list. If the MsgID is stored in the message ID list the confirmation is sent to the message producer that the message corresponding to the MsgID is stored in the message collector.

Next at block 208, the message collector forwards the active message bulk storage to the message consumer. As discussed above, the message collector forwards the active message bulk storage via the executor corresponding to the message type of the active message bulk storage. In one embodiment, the message collector forwards the active message bulk storage if at least one of a plurality of time or memory based conditions is satisfied. The time or memory based conditions may include conditions such as: is the time since the message is stored in the active message bulk storage greater than equal to a preset timeout period, or is the size of the active message bulk storage greater than a preset memory size of the active message bulk storage or the size of the message collector.

In one embodiment, the message consumer consumes the active message bulk storage forwarded by the message collector. In one embodiment, consuming the active message bulk storage includes consuming each of the messages stored in the active message bulk storage.

Next at block 210, the message collector receives the result of consumption of the active message bulk storage. In one embodiment, after the active message bulk storage is consumed by the message consumer the message collector prepares the result of consumption of the active message bulk storage. The message collector then sends the result of consumption to the message producer. The message collector corresponding to the message type of the active message bulk storage sends the result of consumption to the message collector. In one embodiment, the result of consumption includes the result of consumption of each of the message stored in the active message bulk storage.

Finally at block 212, the message collector forwards the result of consumption to the message producer. In one embodiment, the message collector forwards the result of consumption via the result handler corresponding to the message type of the active message bulk storage.

Figure 3A:
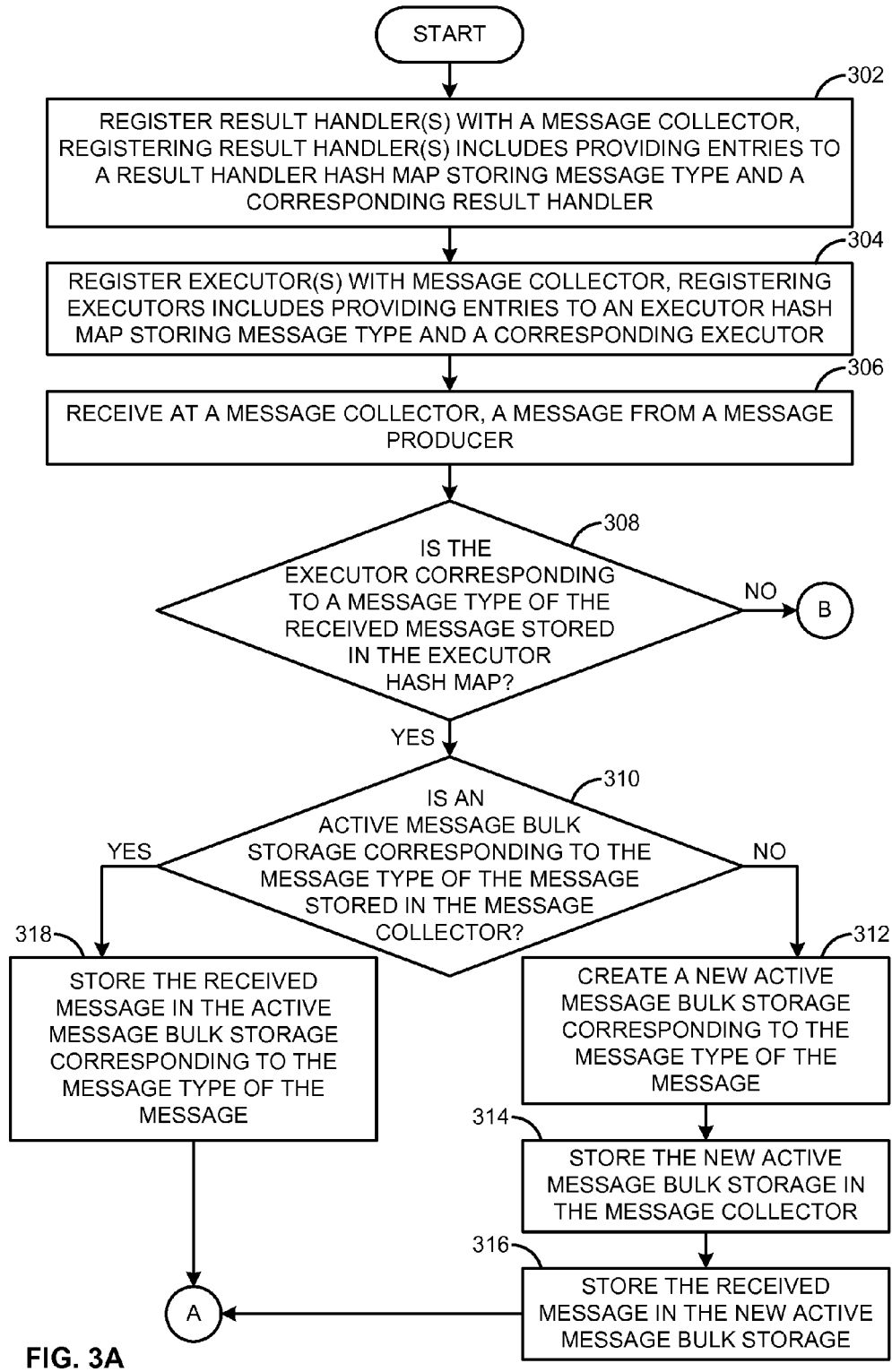
FIG. 3A-3B is a detailed flow diagram illustrating the method for data communication, according to an embodiment.
Figure 3B:
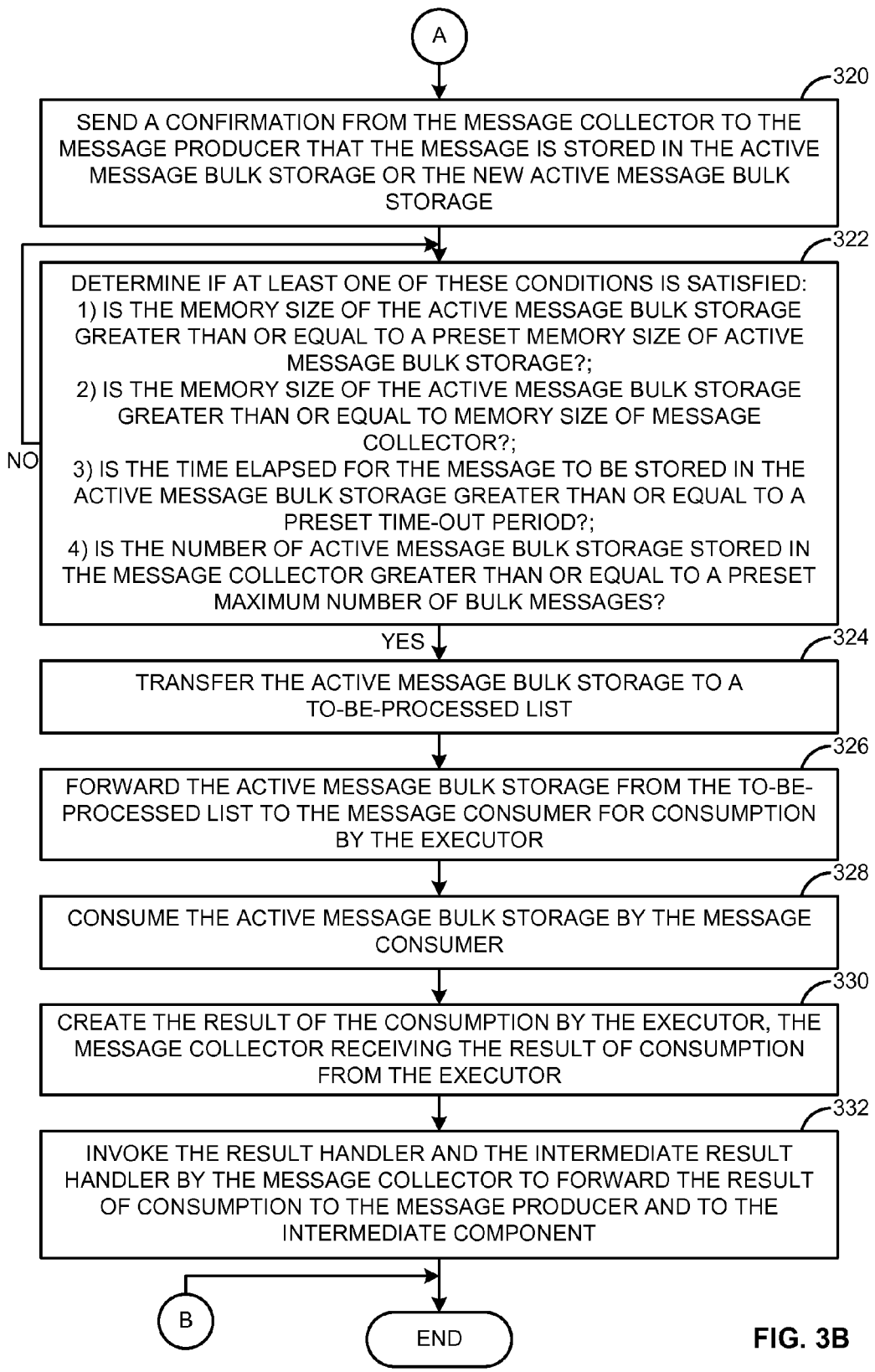

FIG. 3A-3B is a detailed flow diagram illustrating the method for data communication, according to an embodiment.

Initially at block 302, the result handler is registered with the message collector. In one embodiment, the message producer registers the result handler with the message collector.

In one embodiment, the message producer registers a plurality of result handlers with the message collector. Each result handler of the plurality of result handlers is registered for a corresponding message type of the message. For example, the message producer may register a result handler 1 for message type 1, a result handler 2 for message type 2, and a result handler 3 for message type 3.

In one embodiment, each of the plurality of result handlers is registered for a corresponding MsgID of the message. For example, the message producer may register a result handler 1 corresponding to a MsgID 1, a result handler 2 corresponding to a MsgID 2, and a result handler 3 corresponding to a MsgID 3.

A result handler hash map, is stored in the message collector, which has the message type of the message and the result handler corresponding to the message type as entries. In one embodiment, the result handler hash map stores the MsgID of the message and the result handler corresponding to the MsgID of the message. Registering the result handler with the message collector includes providing entries to the result handler hash map stored in the message collector. In one embodiment, providing entries to the result handler hash map includes providing the message type and the result handler corresponding to the message type to the result handler hash map. In one embodiment, providing entries to the result handler hash map includes providing the MsgID and the result handler corresponding to the MsgID to the result handler hash map. In one embodiment, the entries for the result handler hash map are provided by the message producer.

The message collector includes a method void registerResultHandlerForMessage for registering the result handler with the message collector. In one embodiment, the method voidregisterResultHandlerForMessage is invoked by the message producer. In one embodiment, the method void registerResultHandlerForMessage is provided as input the MsgID or the message type of the message, and the result handler corresponding to the message type or the MsgID. Invoking this method by the message producer registers the result handler with the message type or the MsgID of the message provided as input.

In one embodiment, the result handler is an interface. In one embodiment, the result handler is an Application Programming Interface (API). In one embodiment, the result handler is implemented by the message producer.

In one embodiment, the messaging system includes one or more intermediate components. Typically, the intermediate components are present between the message producer and the message consumer. The one or more intermediate components process the message sent from the message producer to the message consumer. In one embodiment, the processing of the message by the one or more intermediate components may include for example: routing of the message, transmission of the message, XML validation of the message, etc.

In one embodiment, an intermediate result handler may also be registered with the message collector. The intermediate result handler is registered with the message collector by the intermediate component. Registering the intermediate result handler with the message collector includes providing entries to the result handler hash map. In one embodiment providing entries to the result handler hash map includes providing the message type or the MsgID and the intermediate result handler corresponding to the message type of the message to the result handler hash map.

The method voidregisterResultHandlerForMessage of the message collector is invoked by the intermediate component. The method void registerResultHandlerForMessage has the MsgID of the message or the message type of the message as input, and the intermediate result handler corresponding to the MsgID or the message type. The method voidregisterResultHandlerForMessage registers the intermediate result handler with the MsgID or the message type provided as input.

Next at block 304, the executor is registered with the message collector. The message consumer registers the executor with the message collector. In one embodiment, the message consumer registers a plurality of executors with the message collector. Each executor of the plurality of executors is registered by the message consumer for a particular message type. For example, an executor 1 may be registered for message type 1, and an executor 2 may be registered for message type 2.

In one embodiment, the message collector stores an executor hash map that stores the message type and the executor corresponding to the message type. Registering the executor hash map with the message collector includes providing entries to the executor hash map. In one embodiment, providing entries to the executor hash map includes providing the message type and the executor corresponding to the message type to the executor hash map. In one embodiment, the entries to the executor hash map are provided by the message consumer.

In one embodiment, the message collector includes a method void registerExecutorForMessageType. The method void registerExecutorForMessageType is invoked by the message consumer. The method registerExecutorForMessageType is provided as input the message type and the executor corresponding to the message type. Invoking this method registers the executor with the message type provided as input to the method registerExecutorForMessageType.

In one embodiment the executor is an interface. In one embodiment, the executor is an Application Programming Interface (API). The executor is implemented by the message consumer.

Next at block 306, the message collector receives a message from the message producer. As discussed above, the message producer is a non-bulk producer of message and sends one message at a time to the message collector.

Next at block 308, a check is performed on the received message to determine if the executor corresponding to the message type of the received message is stored in the executor hash map within the message collector. In one embodiment, if the executor corresponding to the message type of the received message is not stored in the message collector, i.e., if the condition in decision block 308 is false, then the received message is not stored in the message collector.

The message collector includes a method to execute asynchronously. In one embodiment, this method is provided as input the message received from the message producer. This method helps the message producer or the intermediate component to forward the message to the message collector. In one embodiment, this method is invoked by the intermediate component positioned immediately before the message collector. When the executor corresponding to the message type of the message is not stored in the executor hash map this method returns false and the message is not stored in the message collector.

In one embodiment, if the executor corresponding to the message type of the message is stored in the executor hash map, i.e., if the condition in block 308 is true, then a determination is made at decision block 310 whether the active message bulk storage corresponding to the message type of the received message is stored in the message collector. As discussed above, the message collector may store one or more active message bulk storage where each active message bulk storage corresponds to a particular message type.

If the active message bulk storage corresponding to the message type of the received message is not stored in the message collector, i.e., if the condition in decision block 310 is false, then a new active message bulk storage is created (block 312). In one embodiment, the new active message bulk storage created corresponds to the message type of the received message. The new active message bulk storage is stored in the message collector (block 314). In one embodiment, the received message is stored in the new active message bulk storage stored in the message collector (block 316).

If the active message bulk storage corresponding to the message type of the received message is stored in the message collector, i.e., if the condition in decision block 310 is true, then the received message is stored in the active message bulk storage corresponding to the message type of the message (block 318).

In one embodiment, the message collector stores the message ID list. The MsgIDs of each of the messages stored in the message collector is stored in the message ID list. In one embodiment, the MsgIDs of each of the message stored in the active message bulk storage or the new active message bulk storage is stored in the message ID list.

After the message is stored in either the active message bulk storage (block 318) or the new active message bulk storage (block 316), a confirmation is sent from the message collector to the message producer that the message is stored in the active message bulk storage or the new active message bulk storage (block 320), as shown in FIG. 3B. The message collector invokes the result handler corresponding to the message type of the message to send the confirmation to the message producer.

In one embodiment, the message collector sends the confirmation to the intermediate component that the message is stored in either the active message bulk storage or the new active message bulk storage. The message collector invokes the intermediate result handler corresponding to the message type of the message to send the confirmation to the intermediate component.

In one embodiment, the result handler and the intermediate result handler have a method setBulkMode. In one embodiment, the method setBulkMode is provided as input the MsgID of the message stored in the active message bulk storage or the new active message bulk storage. The method setBulkMode is invoked by the message collector after the message is stored in the active message bulk storage or the new active message bulk storage. Invoking the method setBulkMode sends the confirmation to the message producer and the intermediate component that the message is stored in the active message bulk storage or the new active message bulk storage.

As discussed above, the message producer or the intermediate component sends the request to the message collector to determine if the message is stored in the message collector. In one embodiment, the message ID list is checked to determine if the message is stored in the message collector.

The message collector includes a method "Boolean is BulkModeOn." In one embodiment, this method is invoked by the message producer or the intermediate component. In one embodiment, the message producer or the intermediate component provide the MsgID of a message to determine if the message corresponding to the MsgID is stored in the message collector. In one embodiment, the method Boolean is BulkModeOn provides the confirmation, by returning true, to the message producer or the intermediate component if the received message is stored in the message collector.

Next, a check is performed at block 322 to determine if any of the active message bulk storage or the new active bulk storage stored in the message collector satisfies any of a plurality of time or memory based conditions. In one embodiment, the plurality of time or memory based conditions include: 1) the memory size of the active message bulk storage or the new active message bulk size is greater than or equal to a preset memory size of the active message bulk storage, 2) the memory size of the active message bulk storage or the new active message bulk size is greater than or equal to memory size of the message collector, 3) the time elapsed for the message to be stored in the active message bulk storage or the new active message bulk storage is greater than or equal to a preset timeout period, and 4) the number of active message bulk storage stored in the message collector is greater than or equal to a preset maximum number of bulk messages.

In one embodiment, the message collector includes a method setBulkSize. The method setBulkSize is invoked by the executor. The method setBulkSize is provided as input a message type of the message, and the preset memory size of the active message bulk storage corresponding to the message type. Invoking this method sets the preset memory size of the active message bulk storage corresponding to each message type. For example, the preset memory size for the active message bulk storage 1 which corresponds to message type 1 may be set as 5 MB, and the preset memory size for the active message bulk storage 2 which corresponds to message type 2 may be set as 3 MB. In one embodiment, the executor sets the preset memory size for the active message bulk storage.

The executor sets the preset timeout period. A background job ActiveMsgFinderBackGroundJob runs continuously to check if the time elapsed since the message is stored in the active message bulk storage exceeds a preset timeout period. In one embodiment, the memory size of the message collector and the preset maximum number of active message bulk storage is set at design time during the configuration of the message collector.

Next, the active message bulk storage or the new active message bulk storage satisfying at least one of the time or memory based conditions in block 322 is transferred to a to-be-processed list (block 324). The to-be-processed list is stored in the message collector. The to-be-processed list stores the active message bulk storage that is ready to be consumed by the message consumer.

Next, the active message bulk storage or the new active message bulk storage in the to-be-processed list is forwarded to the message consumer for consumption (block 326). The message collector invokes the executor for forwarding the active message bulk storage or the new active message bulk storage from the to-be-processed list to the message consumer.

In one embodiment, the message collector retrieves the executor corresponding to the message type of the active message bulk storage or the new active message bulk storage, stored in the to-be-processed list, from the executor hash map. The message collector invokes the retrieved executor for forwarding the active message bulk storage from the to-be-processed list to the message consumer for consumption. In one embodiment, the active message bulk storage is forwarded to the message consumer by a thread. In one embodiment, the message collector stores a thread pool that provides the thread for forwarding the active message bulk storage or the new active message bulk storage to the message consumer. After the active message bulk storage or the new active message bulk storage is forwarded to the message consumer for consumption the MsgID of the messages stored in the active message bulk storage or the new active message bulk storage is removed from the message ID list.

Next, the active message bulk storage or the new active message bulk storage received by the message consumer is consumed by the consumer (block 328). In one embodiment, the message consumer is a bulk message consumer. In one embodiment, consuming the active message bulk storage includes consuming the message stored in the active message bulk storage by the message consumer. In one embodiment, the message consumer consumes all the messages stored in the active message bulk storage at the same time.

Next, at block 330, the executor creates the result of consumption of the active message bulk storage or the new active message bulk storage after the active message bulk storage or the new active message bulk storage is consumed by the message consumer. In one embodiment, the executor prepares a result of consumption hash map that has the result of consumption of the active message bulk storage or the new active message bulk storage consumed by the message consumer. The result of consumption hash map stores the one or more messages, stored in the active message bulk storage or the new active message bulk storage consumed by the message consumer, and the result of consumption of each of the one or more messages. The result of consumption is successful when the message is successfully consumed by the message consumer and is an exception if the message is not successfully consumed by the message consumer. In one embodiment, the result of consumption hash map also includes the reason for the exception along with the exception.

The message collector receives the result of consumption from the executor. In one embodiment, the result of consumption hash map is received from the executor. In one embodiment, the executor includes a method bulk result execute. This method is invoked by the message collector. In one embodiment, the method bulk result execute has as input the active message bulk storage or the new active message bulk storage stored in the to-be-processed list. Invoking the method bulk result execute transfers the active message bulk storage or the new active message bulk storage stored in the to-be-processed list to the message consumer for consumption. The method bulk result execute returns the result of consumption of the active message bulk storage or the new active message bulk storage to the message collector. In one embodiment, the method bulk result execute returns the result of consumption hash map to the message collector.

Finally, at block 332, the message collector invokes the result handler and the intermediate result handler to transfer the result of consumption to the message producer and the intermediate component, respectively. In one embodiment, the message collector invokes the result handler and the intermediate result handler to transfer the result of consumption hash map to the message producer and the intermediate component, respectively. In one embodiment, the message producer and the intermediate component receive the result of consumption of the active message bulk storage and the new active message bulk storage consumed by the message consumer.

In one embodiment, the result handler and the intermediate result handler include a method handleResults which is invoked by the message collector. The method handleResults is provided as input to the result of consumption hash map. Invoking the method handleResults by the message collector forwards the result of consumption hash map to the message producer and the intermediate component by the result handler and the intermediate result handler, respectively.

Figure 4:
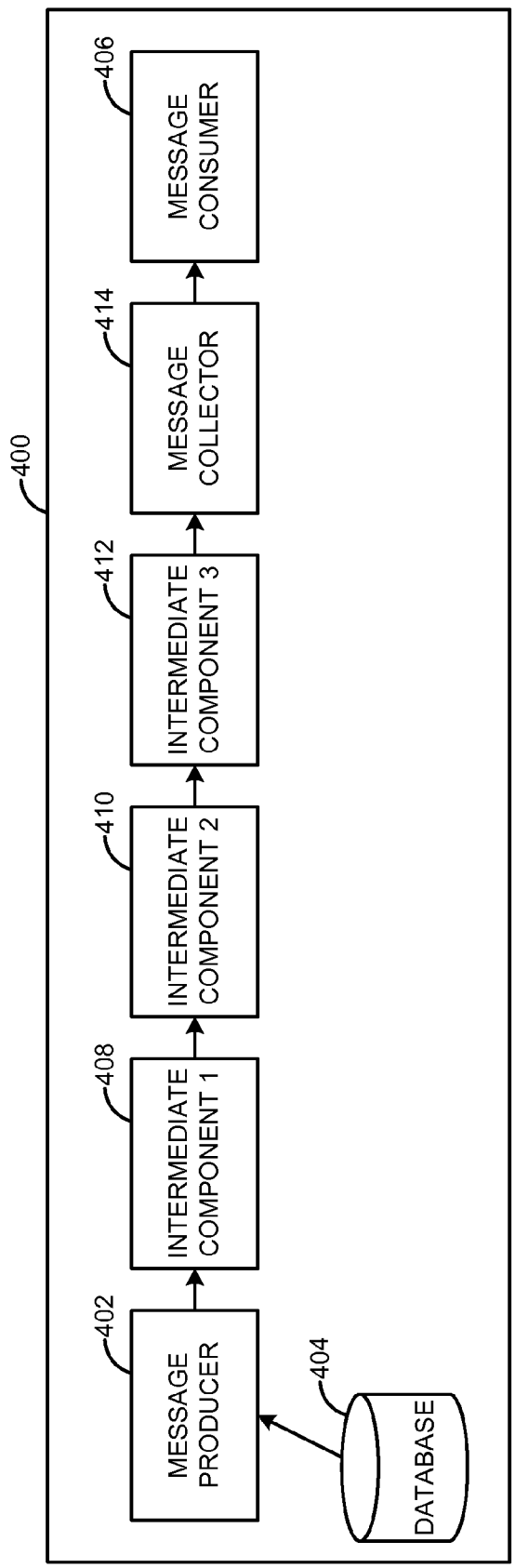
FIG. 4 is a block diagram illustrating an exemplary messaging system, according to an embodiment.

FIG. 4 is a block diagram illustrating an exemplary messaging system 400, according to an embodiment. As shown, the messaging system 400 includes a message producer 402. In one embodiment, the message producer 402 retrieves one or more messages from a database 404. The message producer 402 sends the message to a message consumer 406 for consumption.

The messaging system 400 includes one or more intermediate components (for example, intermediate component 1 408, intermediate component 2 410, and intermediate component 3 412). In one embodiment, the message sent from the message producer 402 to the message consumer 406 passes through each of the intermediate components 408, 410, and 412. Each of the intermediate components 408, 410, and 412 processes the message before the message reaches the message consumer 406. In one embodiment, the messaging system 400 includes a message collector 414. The message collector 414 stores the message received from the message producer 402.

Figure 5:
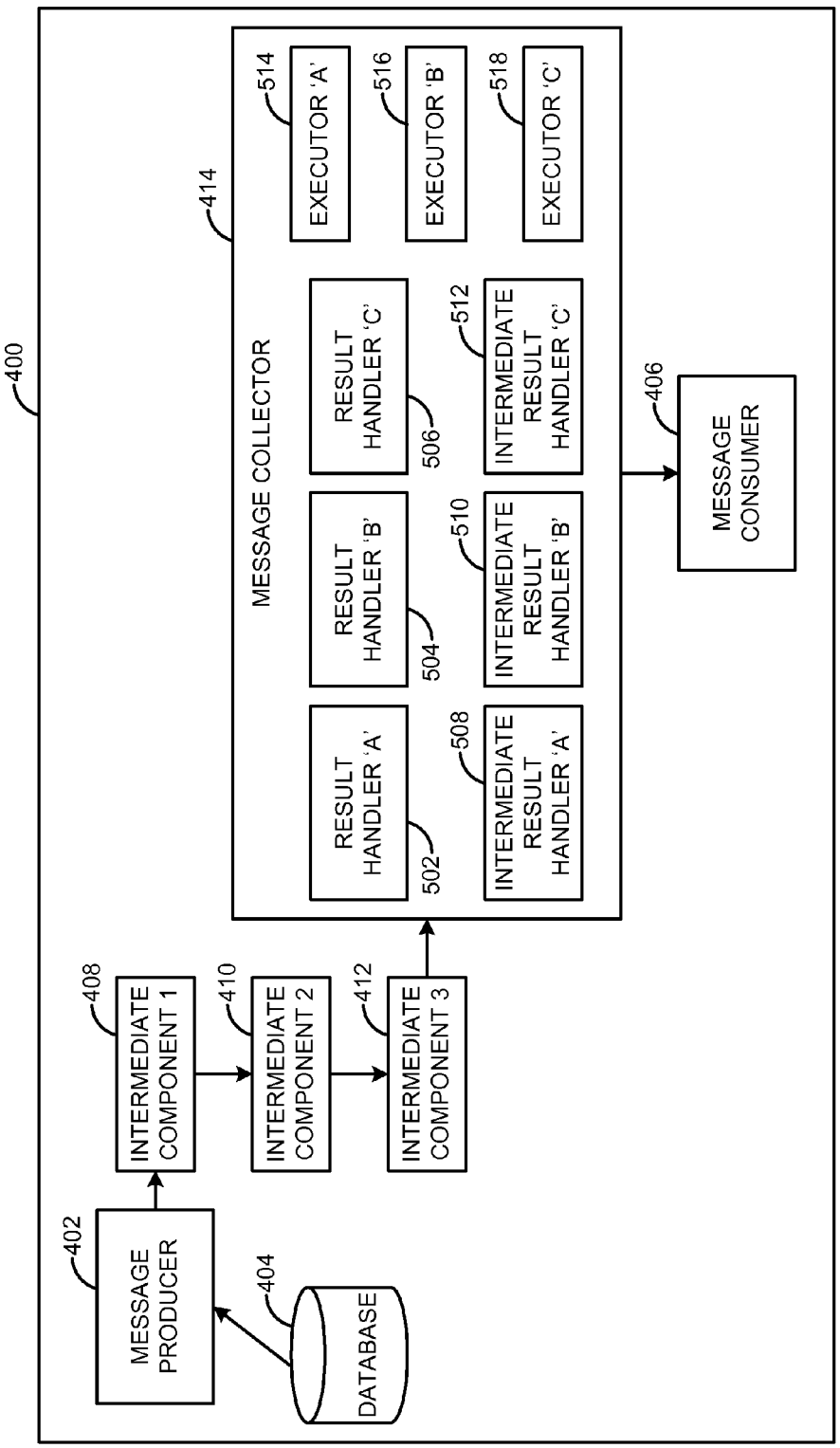
FIG. 5 is a block diagram illustrating data communication in the messaging system of FIG. 4, according to an embodiment.

FIG. 5 is a block diagram illustrating data communication in the messaging system 400 of FIG. 4, according to an embodiment. Initially, the message producer 402 registers result handlers (for example, result handler 'A' 502, result handler 'B' 504, and result handler 'C' 506) with the message collector 414 (as illustrated in block 302 of FIG. 3A). In one embodiment, intermediate component(s) (for example intermediate component 1 408, intermediate component 2 410, or intermediate component 3 412) register intermediate result handlers (for example, intermediate result handler 'A' 508, intermediate result handler 'B' 510 and intermediate result handler 'C' 512) with the message collector 414.

In one embodiment, the message collector 414 includes the method registerResultHandlerForMessage invoked by the message producer 402 and the intermediate component(s) 408, 410, or 412. The message producer 402 provides the following inputs to the method ResultHandlerForMessage:

message type A, result handler 'A' 502; message type B, result handler 'B' 504; and message type C, result handler 'C' 506. The method ResultHandlerForMessage registers the result handler 'A' 502 with message type A, the result handler 'B' 504 with message type B, and the result handler 'C' 506 with message type C.

The intermediate component(s) 408, 410, or 412 provides the following inputs to the method ResultHandlerForMessage: message type A, intermediate result handler 'A' 508, message type B, intermediate result handler 'B' 510, and message type C, intermediate result handler 'C' 512. The method ResultHandlerForMessage registers the intermediate result handler 'A' 508 with message type A, the intermediate result handler 'B' 510 with message type B, and the intermediate result handler 'C' 512 with message type C.

In one embodiment, the message collector 414 stores a result handler hash map. In one embodiment, registering the result handlers 502, 504, and 506, and the intermediate result handlers 508, 510, and 512 includes providing entries to a result handler hash map stored in the message collector 414.

Next, the message consumer 406 registers the executors 514, 516, and 518 with the message collector 414 (as illustrated in block 304 of FIG. 3A). The message collector 414 includes the method registerExecutorForMessageType, which is invoked by the message consumer 406. The message consumer 406 provides the following input to the method registerExecutorForMessageType: (message type A, executor 'A' 514), (message type B, executor 'B' 516), and (message type C, executor 'C' 518). The method registerExecutorForMessageType registers the executor 'A' 514 with message type A, executor 'B' 516 with message type B, and executor 'C' 518 with message type C.

In one embodiment, the message collector 414 stores an executor hash map. Registering the executor 'A' 514, executor 'B' 516, and executor 'C' 518 includes providing entries to the executor hash map storing the message type and the executor corresponding to the message type.

FIG. 6 illustrates a result handler hash map 600 stored in the message collector, according to an embodiment. The result handler hash map 600 stores the message type and the result handler and the intermediate result handler corresponding to the message type. As shown, the result handler hash map 600 has the entries: message type A and the corresponding result handlers (result handler 'A' 502 and the intermediate result handler 'A' 508), message type B and the corresponding result handlers (result handler 'B' 504 and intermediate result handler 'B' 510), and message type C and the corresponding result handlers (result handler 'C' 506 and intermediate result handler 'C' 512).

The message producer provides the message type and the corresponding result handler entries to the result handler hash map 600, i.e., the message producer provides the entries (message type A, result handler 'A' 502), (message type B, result handler 'B' 504), and (message type C, result handler 'C' 506) to the result handler hash map 600.

The intermediate component(s) provides the message type and the corresponding intermediate result handler entries to the result handler hash map 600, i.e., the intermediate component(s) provide the entries (message type A, intermediate result handler 'A'), and (message type B, intermediate result handler 'B'), and (message type C, intermediate result handler 'C') to the result handler hash map 600.

FIG. 7 illustrates the executor hash map 700 stored in the message collector, according to an embodiment. As shown the executor hash map 700 has as entries: the message type A and the corresponding executor 'A' 514, the message type B and the corresponding executor 'B' 516, and the message type C and the corresponding executor 'C' 518. The message consumer provides the entries to the executor hash map 700, i.e., the message consumer provides the following entries (message type A, executor 'A' 514), (message type B, executor 'B' 516), and (message type C, executor 'C' 518).

Next, the message collector receives message 1, message 2, message 3, and message 4 from the message producer (as illustrated in block 306 of FIG. 3A). In one embodiment, the message producer uses a thread 1 to send the message 1, a thread 2 to send the message 2, a thread 3 to send the message 3, and a thread 4 to send the message 4. In one embodiment, the message 1 and message 3 have a message type A, the message 2 has a message type B, and the message 4 has a message type C.

Next, a check is performed to determine if the executor corresponding to the message type, i.e., A, B, and C, of the received messages 1 to 4 is stored in the executor hash map 700 (as illustrated in block 308 of FIG. 3A). In one embodiment, if the executor corresponding to the message type of the message is not stored in the executor hash map 700 the message is not stored in the message collector.

If the executor corresponding to the message type of the message is stored in the executor hash map 700 a check is performed to determine if the active message bulk storage corresponding to the message type of each of the messages 1 to 4 is stored in the message collector (as illustrated in block 310 of FIG. 3A). As the executor hash map 700 stores the executor 'A' 514, the executor 'B' 516, and the executor 'C' 518 corresponding to the message types A, B, and C of messages 1 to 4, the check is performed to determine if the active message bulk storage corresponding to the message types A, B, and C of the messages 1 to 4 is stored in the message collector. In one embodiment, the message collector does not initially store any active message bulk storage.

Next, as the message collector does not initially store the active message bulk storage corresponding to the messages types of the message 1 to 4 a new active message bulk storage is created corresponding to the message type A, B, and C of messages 1 to 4 (as illustrated in block 312 of FIG. 3A). When the message 1, which has the message type A, is received a new active message bulk 'A' storage is created and stored in the message collector (as illustrated in blocks 312 and 314 of FIG. 3A). The message 1 is then stored in the new active message bulk 'A' storage (as illustrated in block 316 of FIG. 3A). When the message 2, which has the message type B is received, new active message bulk 'B' storage is created and stored in the message collector (as illustrated in blocks 312 and 314 of FIG. 3A). The message 2 is then stored in the active message bulk 'B' storage (as illustrated in block 316 of FIG. 3A).

Next, when the message 3, which has the message type A is received, the check is performed to determine if the active message bulk storage corresponding to the message type A of the message 3 is stored in the message collector (as illustrated in block 310 of FIG. 3A). In one embodiment, as the active message bulk 'A' storage corresponding to the message type A of the message 3 is stored in the message collector, the message 3 is stored in the active message bulk 'A' storage (as illustrated in block 318 of FIG. 2A).

Next, when the message 4, which has the message type C is received, new active message bulk 'C' storage is created and stored in the message collector 414 (as illustrated in blocks 312 and 314 of FIG. 3A). The message 4 is then stored in the new active message bulk 'C' storage (as illustrated in block 316 of FIG. 3A).

After each of the messages 1 to 4 are stored in the message collector, the active message bulk 'A' storage includes message 1 and message 3 (active message bulk 'A' storage [message 1, message 3]); active message bulk 'B' storage includes message 2 (active message bulk 'B' storage [message 2]); and active message bulk 'C' storage includes message 4 (active message bulk 'C' storage [message 4]).

The message collector stores an active message bulk storage hash map, which stores the message type and the active message bulk storage corresponding to the message type. FIG. 8 illustrates the active message bulk storage hash map 800 stored in the message collector, according to an embodiment. As shown, the active message bulk storage hash map 800 has entries: (message type A and the corresponding active message bulk 'A' storage), (message type B and the corresponding active message bulk 'B' storage), and (message type C and the corresponding active message bulk 'C' storage).

After each of the messages 1 to 4 are stored in the active message bulk storage or the new active message bulk storage, the message collector sends a confirmation to the message producer and the intermediate component. The confirmation informs the message producer and the intermediate component that the message is stored in the message collector (as illustrated in block 320 of FIG. 3B). After the message 1 is stored in the active message bulk storage 'A', the message collector invokes the result handler 'A' and the intermediate result handler 'A' to send the confirmation to the message producer and the intermediate component, respectively, informing the message producer and the intermediate component that the message 1 is stored in the active message bulk 'A' storage.

Similarly, after each of the messages (message 2, message 3, and message 4) is stored in the active message bulk 'B' storage, active message bulk 'A' storage, and the active message bulk 'C' storage, respectively, the message collector invokes the result handler 'B', the result handler 'A', and the result handler 'C', respectively, and the intermediate result handler 'B', the intermediate result handler 'A', and the intermediate result handler 'C', respectively, to send the confirmation to the message producer and the intermediate component, respectively, informing the message producer and the intermediate component that the messages (message 2, message 3, and message 4) are stored in the active message bulk 'B' storage, active message bulk 'A' storage, and active message bulk 'C' storage, respectively.

In one embodiment, the message ID list stores the MsgID of each of the messages 1 to 4 stored in the message collector. In one embodiment, message 1 has a MsgID 1, message 2 has a MsgID 2, message 3 has a MsgID 3, and message 4 has a MsgID 4.

FIG. 9 illustrates the message ID list 900 storing the MsgIDs of each of the messages stored in the message collector, according to an embodiment. As shown, the message ID list 900 includes MsgIDs 1 to 4 of the messages 1 to 4 after the messages 1 to 4 are stored in the active message bulk 'A' storage, active message bulk 'B' storage, and active message bulk 'C' storage.

The message producer or the intermediate component may send a request, by sending a MsgID, to the message collector to determine if the message corresponding to the MsgID is stored in the message collector. In one embodiment, the message producer or the intermediate component sends the request by sending the MsgID 1 to the message collector. In one embodiment, the message producer sends the request by providing the MsgID 1 as input to the method is BulkModeOn of the message collector.

The message ID list 900 is checked to determine if the MsgID 1 is stored in the message ID list 900. In one embodiment, as the MsgID 1 is stored in the message ID list 900 the message collector sends the confirmation to the message producer informing the message producer or the intermediate component that the message 1 is stored in the active message bulk 'A' storage. In one embodiment, the method is BulkModeOn sends the confirmation, by returning a True, as the message 1 is stored in the active message bulk 'A' storage.

Next, a determination is made to check if the active message bulk 'A' storage, the active message bulk 'B' storage, or the active message bulk 'C' storage satisfies at least one of the plurality of time or memory based conditions: 1) the memory size of the active message bulk storage is greater than or equal to a preset memory size of active message bulk storage, 2) the memory size of the active message bulk storage is greater than or equal to the memory size of the message collector, 3) the time elapsed for the message to be stored in the active message bulk storage is greater than or equal to a preset timeout period, and 4) the number of active message bulk storage stored in the message collector is greater than or equal to a preset maximum number of the active message bulk storage (as illustrated in block 322 of FIG. 2B).

The preset memory size for each of the active message bulk 'A' storage, the active message bulk 'B' storage, and the active message bulk 'C' storage memory is set by the executor 'A', executor 'B', and executor 'C', respectively. In one embodiment, the preset memory size for active message bulk 'A' storage is set as 5 MB, for the active message bulk size 'B' storage is set as 4 MB, and for the active message bulk 'C' storage is set as 6 MB.

In one embodiment, the preset time-out for each of the active message bulk 'A' storage, active message bulk 'B' storage, and active message bulk 'C' storage is set as 60 seconds. In one embodiment, the preset timeout period is set at design time when the message collector is configured. In one embodiment, the preset time out period is set by the executor 'A', executor 'B', and executor 'C'.

In one embodiment, the memory size of the message collector is 50 MB. In one embodiment, the preset maximum number of active message bulk storage in the message collector is set as 10. In one embodiment, the memory size of the message collector and the preset maximum number of active message bulk storage is set at design time during the configuration of the message collector. In the above exemplary embodiment, the memory size of each of the messages 1 to 4 is 2.5 MB.

In one embodiment, the background job ActiveMsgFinderBackGroundJob runs continuously to check if the time elapsed since the message 1 is stored in the active message bulk 'A' storage is greater than or equal to 60 seconds, the time elapsed since the message 2 is stored in the active message bulk 'B' storage is greater than or equal to 60 seconds, and the time elapsed since the message 4 is stored in the active message bulk 'C' is greater than or equal to 60 seconds.

Next, the active message bulk 'A' storage, the active message bulk 'B' storage, or the active message bulk 'C' storage satisfying at least one of the conditions discussed above is transferred to a to-be-processed list stored in the message collector (as illustrated in block 324 of FIG. 3B). In one embodiment, the active message bulk 'A' storage has memory size as 5 MB, as message 1 and message 2 both have a memory size of 2.5 MB. In one embodiment, the active message bulk 'A' storage satisfies at least one of the conditions discussed above as the memory size of the active message bulk 'A' storage is equal to the preset memory size of active message bulk 'A' storage (5 MB). Next, the active message bulk 'A' storage which satisfies the condition discussed above is transferred to the to-be-processed list stored in the message collector (as illustrated in block 324 of FIG. 3B).

Next, the message collector forwards the active message bulk 'A' storage, which stores message 1 and message 3, to the message consumer for consumption. The message collector invokes the executor 'A' to transfer the active message bulk 'A' storage to the message consumer for consumption (as illustrated in block 326 of FIG. 3B). In one embodiment, after the active message bulk 'A' storage is forwarded to the message consumer for consumption the MsgIDs 1 and 3 corresponding to message 1 and message 3 stored in the active message bulk 'A' storage are removed from the message ID list 900.

Next, the message consumer consumes the active message bulk 'A' storage. In one embodiment, consuming the active message 'A' bulk storage includes consuming message 1 and message 3 stored in the active message bulk 'A' storage by the message consumer (as illustrated in block 328 of FIG. 3B).

In one embodiment, the result of consumption of message 1 by the message consumer is successful. In one embodiment, the result of consumption of message 3 by the message consumer is unsuccessful (exception).

Next, the executor 'A' prepares the result of consumption of the active message 'A' bulk storage by the message consumer. In one embodiment, the executor 'A' prepares the result of consumption hash map, which stores the message 1 and message 3 stored in the active message bulk 'A' storage and the result of consumption of the message 1 and message 3 by the message consumer.

FIG. 10 illustrates the result of consumption hash map 1000 stored in the message collector, according to an embodiment. As shown, the result of consumption hash map 1000 has the result of consumption of message 1 as successful, and the result of consumption of message 3 as exception as entries. In one embodiment, the exception includes the reason for the exception.

Next, the message collector receives the result of consumption hash map 1000 from executor 'A'. The executor 'A' includes a method bulk result execute. In one embodiment, this method is called by the message collector. In one embodiment, the method bulk result execute has an input to the active message bulk 'A' storage stored in the to-be-processed list. In one embodiment, invoking the method bulk result execute transfers the active message 'A' bulk storage stored in the to-be-processed list to the message consumer for consumption. In one embodiment, the method bulk result execute returns the result of consumption to the message collector (as illustrated in block 330 of FIG. 3B).

Next, the message collector invokes the result handler 'A' and the intermediate result handler 'A' to forward the result of consumption hash map 1000 to the message producer and the intermediate component, respectively.

Finally, the result handler 'A' and the intermediate result handler 'A' forward the result of consumption 1000 to the message producer and the intermediate component, respectively (as illustrated in block 332 of FIG. 3B).

The result handler 'A' and the intermediate result handler 'A' includes a method handleResults. In one embodiment, the method handleResults is invoked by the message collector. In one embodiment, the method handleResults is provided as input to the result of consumption hash map 1000. In one embodiment, invoking the method handleResult by the message collector forwards the result of consumption hash map 1000 to the message producer and the intermediate component.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 11:
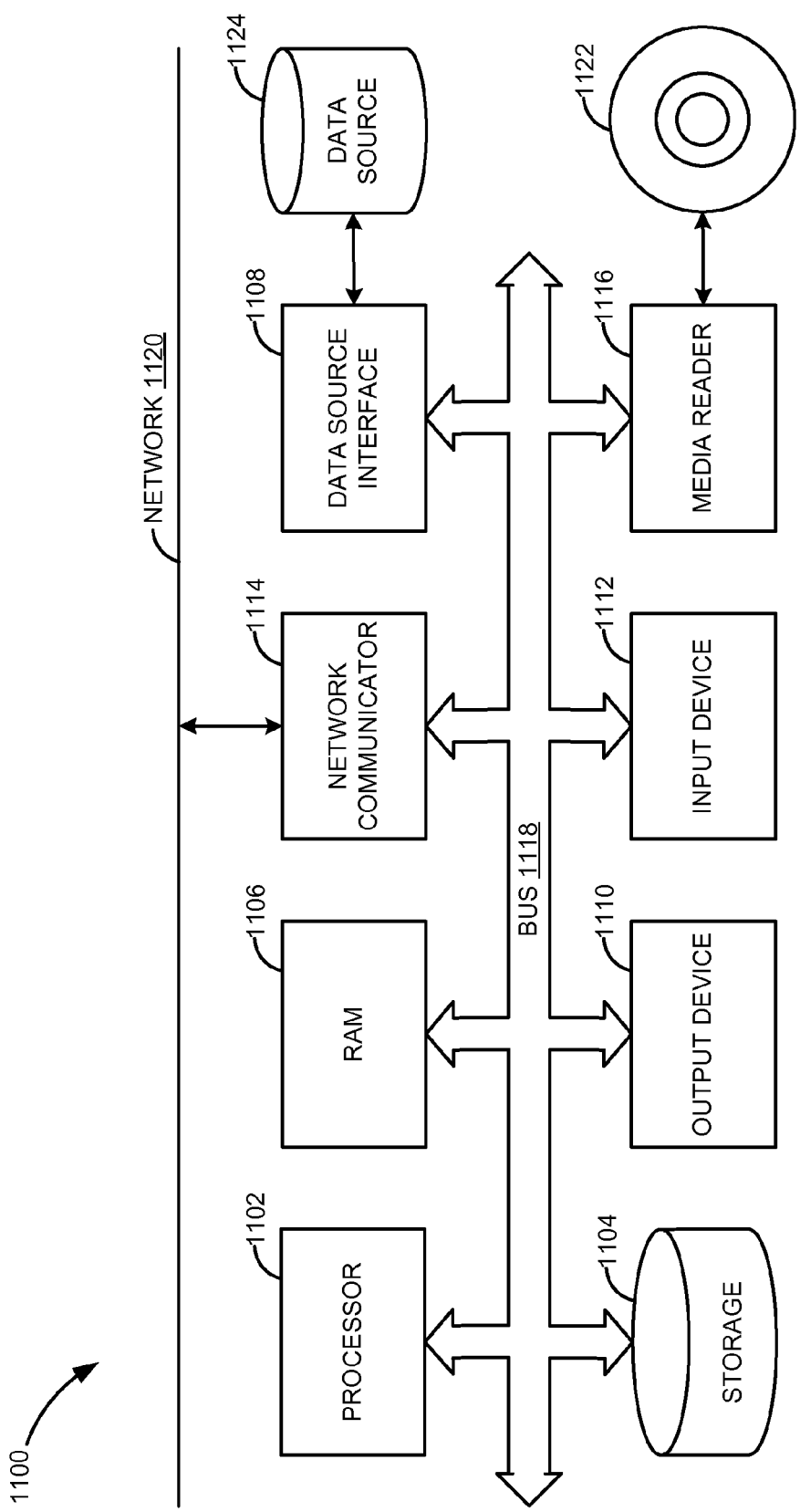
FIG. 11 is a block diagram illustrating a computing environment in which the techniques described for the transaction message collector can be implemented, according to an embodiment.

FIG. 11 is a block diagram of an exemplary computer system 1100. The computer system 1100 includes a processor 1102 that executes software instructions or code stored on a computer readable storage medium 1122 to perform the above-illustrated methods of the invention. The computer system 1100 includes a media reader 1116 to read the instructions from the computer readable storage medium 1122 and store the instructions in storage 1104 or in random access memory (RAM) 1106. The storage 1104 provides a large space for keeping static data where at least some instructions could be stored for later execution. The stored instructions may be further compiled to generate other representations of the instructions and dynamically stored in the RAM 1106. The processor 1102 reads instructions from the RAM 1106 and performs actions as instructed. According to one embodiment of the invention, the computer system 1100 further includes an output device 1110 (e.g., a display) to provide at least some of the results of the execution as output including, but not limited to, visual information to users and an input device 1112 to provide a user or another device with means for entering data and/or otherwise interact with the computer system 1100. Each of these output devices 1110 and input devices 1112 could be joined by one or more additional peripherals to further expand the capabilities of the computer system 1100. A network communicator 1114 may be provided to connect the computer system 1100 to a network 1120 and in turn to other devices connected to the network 1120 including other clients, servers, data stores, and interfaces, for instance. The modules of the computer system 1100 are interconnected via a bus 1118. Computer system 1100 includes a data source interface 1108 to access data source 1124. The data source 1124 can be accessed via one or more abstraction layers implemented in hardware or software. For example, the data source 1124 may be accessed by network 1120. In some embodiments the data source 1124 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for data communication, the computer implemented method comprising:
   receiving, at a message collector, a message from a message producer;
   storing the message in an active message bulk storage in the message collector, wherein the active message bulk storage is selected in correspondence to a message type of the message;
   sending a confirmation from the message collector to the message producer via a result handler corresponding to the message type of the message, the confirmation informing the message producer that the message is stored in the active message bulk storage;
   forwarding the active message bulk storage from the message collector to a message consumer upon determining that at least one of a plurality of time or memory based conditions is satisfied, wherein the active message bulk storage is forwarded to the message consumer via an executor corresponding to a message type of the active message bulk storage, wherein one or more of the plurality of time or memory based conditions are based on a preset memory size of the active message bulk storage or a preset timeout period set by the executor;
   receiving, at the message collector, a result of consumption of the active message bulk storage from the executor corresponding to the message type of the active message bulk storage; and
   forwarding the result of consumption of the active message bulk storage from the message collector to the message producer via the result handler corresponding to the message type of the active message bulk storage.

2. The computer implemented method according to claim 1, further comprising:
   receiving, at the message collector, a request from the message producer to determine whether the message sent from the message producer is stored in the message collector; and
   sending the confirmation from the message collector to the message producer, via the result handler corresponding to the message type of the message, based on the determination.

3. The computer implemented method according to claim 1, wherein storing the message in the active message bulk storage comprises:
   creating a new active message bulk storage upon determining that the active message bulk storage corresponding to the message type of the message is not stored in the message collector;
   storing the new active message bulk storage in the message collector; and
   storing the message in the new active message bulk storage in a manner corresponding to the message type of the message.

4. The computer implemented method according to claim 1, further comprising:
   an intermediate component registering an intermediate result handler with the message collector, wherein registering the intermediate result handler includes providing entries to a result handler hash map storing the message type and the intermediate result handler corresponding to the message type, the result handler hash map being stored in the message collector; and
   sending the confirmation from the message collector to the intermediate component by invoking the intermediate result handler, the intermediate result handler being invoked by the message collector.

5. The computer implemented method according to claim 1, further comprising:
   the message producer registering the result handler with the message collector, wherein registering the result handler includes providing entries to a result handler hash map storing the message type of the message and the result handler corresponding to the message type, the result handler hash map being stored in the message collector.

6. The computer implemented method according to claim 1, further comprising:
   the message consumer registering the executor with the message collector, wherein registering the executor includes providing entries to an executor hash map storing the message type and the executor corresponding to the message type, the executor hash map being stored in the message collector.

7. The computer implemented method according to claim 6, further comprising:
   determining whether the executor corresponding to the message type of the message sent from the message producer is stored in the executor hash map; and
   storing the message in the active message bulk when the executor corresponding to the message type of the message is stored in the executor hash map.

8. The computer implemented method according to claim 1, further comprising:
   transferring the active message bulk storage to a to-be-processed list stored in the message collector; and
   forwarding the active message bulk storage stored in the to-be-processed list to the message consumer for consumption, the message collector invoking the executor corresponding to the message type of the active message bulk storage for forwarding the active message bulk storage to the message consumer.

9. The computer implemented method according to claim 1, wherein the executor corresponding to the message type of the active message bulk prepares the result of consumption of the active message bulk storage by the message consumer.

10. The computer implemented method according to claim 1, wherein the plurality of time and memory based conditions comprises:
    determining whether memory size of the active message bulk storage is greater than or equal to the preset memory size of the active message bulk storage size;
    determining whether memory size of the active message bulk storage is greater than or equal to memory size of the message collector;
    determining whether time elapsed for the message to be stored in the active message bulk storage is greater than or equal to the preset timeout period; and
    determining whether a number of the active message bulk storage stored in the message collector is greater than or equal to a preset maximum number of active message bulk storage.

11. A non-transitory computer readable medium to store instructions, which when executed by a computer, cause the computer to:
    receive at a message collector, a message from a message producer;
    store the message in an active message bulk storage stored in the message collector, wherein the active message bulk storage is selected in correspondence to a message type of the message;
    send a confirmation from the message collector to the message producer, the confirmation informs the message producer that the message is stored in the active message bulk storage;
    forward the active message bulk storage from the message collector to a message consumer upon determining that at least one of a plurality of time or memory based conditions is satisfied, wherein the active message bulk storage is forwarded to the message consumer via an executor corresponding to a message type of the active message bulk storage, wherein one or more of the plurality of time or memory based conditions are based on a preset memory size of the active message bulk storage and a preset timeout period set by the executor;
    receive, at the message collector, a result of consumption of the active message bulk storage from the executor corresponding to the message type of the active message bulk storage; and
    forward the result of consumption of the active message bulk storage from the message collector to the message producer via the result handler corresponding to the message type of the active message bulk storage.

12. The non-transitory computer readable medium according to claim 11, further comprising instructions which when executed by the computer further causes the computer to:
    receive, at the message collector, a request from the message producer to determine whether the message sent from the message producer is stored in the message collector; and
    send the confirmation from the message collector to the message producer via the result handler corresponding to the message type of the message based on the determination.

13. The non-transitory computer readable medium according to claim 11, wherein storing the message in the active message bulk storage comprises:
    create a new active message bulk storage upon determining that the active message bulk storage corresponding to the message type of the message is not stored in the message collector;
    store the new active message bulk storage in the message collector; and
    store the message in the new active message bulk storage in a manner corresponding to the message type of the message.

14. The non-transitory computer readable medium according to claim 11, further comprising instructions which when executed by the computer further causes the computer to:
    register an intermediate result handler with the message collector, the intermediate result handler being registered by an intermediate component, wherein registering the intermediate result handler includes providing entries to a result handler hash map storing the message type and the intermediate result handler corresponding to the message type, the result handler hash map being stored in the message collector; and
    send the confirmation from the message collector to the intermediate component by invoking the intermediate result handler, the intermediate result handler being invoked by the message collector.

15. The non-transitory computer readable medium according to claim 11, further comprising instructions which when executed by the computer further causes the computer to:
    register the result handler with the message collector, the result handler being registered by the message producer, wherein registering the result handler includes providing entries to a result handler hash map storing the message type and the result handler corresponding to the message type, the result handler hash map being stored in the message collector.

16. The non-transitory computer readable medium according to claim 11, further comprising instructions which when executed by the computer further causes the computer to:
register the executor with the message collector, the executor being registered by the message consumer, wherein registering the executor includes providing entries to an executor hash map storing the message type and the executor corresponding to the message type, the executor hash map being stored in the message collector.

17. The non-transitory computer readable medium according to claim 16, further comprising instructions which when executed by the computer further causes the computer to:
determine whether the executor corresponding to the message type of the message is stored in the executor hash map; and
store the message in the active message bulk storage when the executor corresponding to the message type of the message is stored in the executor hash map.

18. The non-transitory computer readable medium according to claim 11, further comprising instructions which when executed by the computer further causes the computer to:
transfer the active message bulk storage to a to-be-processed list stored in the message collector; and
forward the active message bulk storage stored in the to-be-processed list to the message consumer for consumption, the message collector invoking the executor for forwarding the active message bulk storage to the message consumer.

19. The non-transitory computer readable medium according to claim 11, wherein the executor corresponding to the message type of the active message bulk prepares the result of consumption of the active message bulk storage by the message consumer.

20. The non-transitory computer readable medium according to claim 11, wherein the plurality of time and memory based conditions comprises:
determine whether memory size of the active message bulk storage is greater than or equal to the preset memory size of the active message bulk storage size;
determine whether memory size of the active message bulk storage is greater than or equal to memory size of the message collector;
determine whether time elapsed for the message to be stored in the active message bulk storage is greater than or equal to the preset timeout period; and
determine whether a number of the active message bulk storage stored in the message collector is greater than or equal to a preset maximum number of active message bulk storage.

21. A computer system for implementing a process including a set of sub-tasks, the computer system comprising:
a memory to store program code; and
a processor communicatively coupled to the memory, the processor to execute the program code, the program code comprising:
a message producer to send a message to a message collector;
the message collector to:
store the message in an active message bulk storage corresponding to a message type of the message;
send a confirmation to the message producer via a result handler corresponding to the message type of the message;
forward the active message bulk storage from the message collector to a message consumer upon determining that at least one of a plurality of time or memory based conditions is satisfied, wherein the active message bulk storage is forwarded to the message consumer via an executor corresponding to a message type of the active message bulk storage, wherein one or more of the plurality of time or memory based conditions are based on a preset memory size of the active message bulk storage and a preset timeout period set by the executor;
receive, from the executor corresponding to the message type of the active message bulk storage, a result of consumption of the active message bulk storage by the message consumer; and
forward the result of consumption of the active message bulk storage to the message producer via the result handler corresponding to the message type of the active message bulk storage; and
the message consumer to consume the active message bulk storage forwarded by the message collector.

22. The computer system according to claim 21, wherein the program code further comprises:
the message producer to send a request, to the message collector, to determine whether the message is stored in the message collector; and
the message collector to send the confirmation to the message producer based on the determination.

23. The computer system according to claim 21, wherein storing the message in the active message bulk storage comprises:
create a new active message bulk storage upon determining that the active message bulk storage corresponding to the message type of the message is not stored in the message collector;
store the new active message bulk storage in the message collector; and
store the message in the new active message bulk storage in a manner corresponding to the message type of the message.

24. The computer system according to claim 21, wherein the program code further comprises:
an intermediate result handler to register an intermediate result handler with the message collector, wherein registering the intermediate result handler includes providing entries to a result handler hash map storing the message type and the intermediate result handler corresponding to the message type, the result handler hash map being stored in the message collector; and
wherein the message collector is further operable to send the confirmation to the intermediate component by invoking the intermediate result handler, the intermediate result handler being invoked by the message collector.

25. The computer system according to claim 21, wherein the program code further comprises:
code for the message producer to register the result handler with the message collector, wherein registering the result handler includes providing entries to a result handler hash map storing the message type and the result handler corresponding to the message type, the result handler hash map being stored in the message collector.

26. The computer system according to claim 21, wherein the program code further comprises:
code for the message collector to register the executor with the message collector, wherein registering the executor includes providing entries to an executor hash map storing the message type and the executor corresponding to the message type, the executor hash map being stored in the message collector.

27. The computer system according to claim 26, wherein the program code further comprises:
    code for the message producer to determine whether the executor corresponding to the message type of the message is stored in the executor hash map; and
    code for the message collector to store the message in the active message bulk storage when the executor corresponding to the message type of the message is stored in the executor hash map.

28. The computer system according to claim 21, wherein the program code further comprises:
    code for the message collector to:
        transfer the active message bulk storage to a to-be-processed list stored in the message collector; and
        forward the active message bulk storage stored in the to-be-processed list to the message consumer for consumption.

29. The computer system according to claim 21, wherein the executor corresponding to the message type of the active message bulk prepares the result of consumption of the active message bulk storage by the message consumer.

30. The computer system according to claim 21, wherein the plurality of time or memory based conditions comprises:
    determine whether memory size of the active message bulk storage is greater than or equal to the preset memory size of the active message bulk storage size;
    determine whether memory size of the active message bulk storage is greater than or equal to memory size of the message collector;
    determine whether time elapsed for the message to be stored in the active message bulk storage is greater than or equal to the preset timeout period; and
    determine whether a number of the active message bulk storage stored in the message collector is greater than or equal to a preset maximum number of active message bulk storage.

* * * * *